United States Patent Office 3,480,525
Patented Nov. 25, 1969

3,480,525
PROCESS FOR PRODUCING POLYMERS BY THE ELECTROREDUCTION OF SULFONIUM COMPOUNDS
Ritchie A. Wessling and William J. Settineri, Midland, Mich., assignors to The Dow Chemical Company, Midland, Mich., a corporation of Delaware
No Drawing. Filed June 22, 1967, Ser. No. 647,895
Int. Cl. B01k *1/00*
U.S. Cl. 204—59          11 Claims

ABSTRACT OF THE DISCLOSURE

A process for preparing polymers of repeat units having the formula

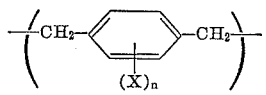

(e.g., poly-p-xylylene) by subjecting a solution in an electrolysis solvent (e.g., water or a polar organic solvent) of a sulfonium salt having the formula

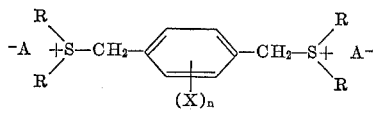

wherein X is a halogen or lower alkyl group, $n$ is an integer of from 0 to 4, R is a lower alkyl or hydroxyalkyl group, and $A^-$ is an electrolytically acceptable anion (typically an anion of a strong acid), to an electrical potential sufficient to reduce the sulfonium salt.

The resulting polymers are thermoplastic solids useful as coatings, molding resins, and the like.

FIELD OF THE INVENTION

The present invention relates to a novel process for the electroreduction of sulfonium salts to produce polymers. More particularly, it relates to the electrochemical reduction of solutions of certain sulfonium salts in electrolysis solvents to produce poly-p-xylylene and similar polymers.

As used herein, the term "electrolysis solvent" refers to water and those polar organic liquids conventionally employed as media for electrochemical synthesis.

DESCRIPTION OF THE PRIOR ART

The preparation of poly-p-xylylene by the chemical reduction of alpha-halogenated p-xylenes with base is described by Gilch and Wheelwright, J. Poly. Sci., 4, A–1, 1337 (1966). Its preparation by the electrolytic reduction of alpha, alpha'-dihalo-p-xylenes in tetrahydrofuran is disclosed by Gilch in J. Poly. Sci., 4, A–1, 1351 (1966).

The polarography (i.e., the electroreducibility) of sulfonium salts is known, as described for example by Colichman and Love, J. Orgn. Chem., 18, 40 (1953). However, the production of any useful material by the electroreduction of sulfonium salts has hitherto not been disclosed, nor has the production of poly-p-xylylene by electrochemical means from an aqueous solution.

SUMMARY OF THE INVENTION

It has now been discovered that solutions of certain sulfonium salts may be electrochemically reduced to prepare poly-p-xylylene and similar polymers. The polymers thus prepared are of repeat units having the formula

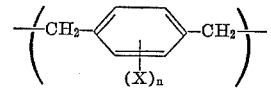

wherein X is a halogen or lower alkyl group and $n$ is an integer of from 0 to 4. They are prepared by subjecting a solution in an electrolysis solvent (i.e., water or a polar organic solvent) of a sulfonium salt having the formula

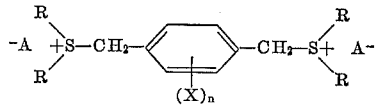

wherein X and $n$ are as defined above, R is, independently in each case, a lower alkyl or hydroxyalkyl group (desirably containing from 1 to 4 carbon atoms), and $A^-$ is an electrolytically acceptable anion (typically an anion of a strong acid), to an electrical potential sufficient to reduce the sulfonium salt. If water is employed as the electrolysis solvent, it is necessary to use a cathode having a sufficient hydrogen overvoltage to allow a high enough electrical potential to reduce the sulfonium salt to be attained.

DETAILED DESCRIPTION OF THE INVENTION

Suitable specific examples of sulfonium salts for polymerization by electrolytic reduction according to the process of this invention include the p-phenylene-dimethylene-bis(dialkylsulfonium halides), such as p-phenylenedimethylene-bis(dimethylsulfonium chloride), p-phenylenedimethylene-bis(dimethylsulfonium bromide), p-phenylenedimethylene-bis(diethylsulfonium chloride), and the like; halogen substituted p-phenylenedimethylene-bis(dialkyl sulfonium halides), such as chloro-p-phenylenedimethylene - bis(dimethylsulfonium chloride), bromo-p-phenylenedimethylene - bis(dimethylsulfonium chloride), trichloro - p - phenylenedimethylene - bis(dimethylsulfonium chloride), chloro-p-phenylenedimethylene-bis(diethylsulfonium chloride), and the like; alkyl substituted p - phenylenedimethylene - bis(dialkylsulfonium halides), such as 2,5-dimethyl-p-phenylenedimethylene-bis(dimethylene-bis(dimethylsulfonium chloride), ethyl-p-phenylenedimethylene-bis(diethylsulfonium chloride), and the like; p-phenylene and halogen or alkyl substituted p-phenylenedimethylene - bis(hydroxyalkylsulfonium halides), such as p-phenylenedimethylene-bis[di(hydroxyethyl)sulfonium chloride], trichloro-p-phenylenedimethylene-bis-[di(hydroxyethyl)sulfonium chloride], p - phenylenedimethylene-bis[di(hydroxyisopropyl)sulfonium chloride], 2,5 - dimethyl - p - phenylenedimethylene - bis[di(hydroxyethyl)sulfonium chloride], and the like; the corresponding nitrate, tosylate, toluene sulfonate, perchlorate, and fluoroborate salts; and the like. The preferred sulfonium compounds for electrolytic polymerization according to the process of this invention are p-phenylenedimethylene-bis(dimethylsulfonium chloride) and 2,5-dimethyl - p - phenylenedimethylene - bis(dimethylsulfonium chloride).

The above and other sulfonium compounds suitable for electrolytic polymerization according to the process of this invention may be prepared by methods known in the art, such as by reacting the corresponding dihalide with a dialkyl or di(hydroxyalkyl)sulfide. The preparation of sulfonium salts by this and other methods is reviewed in Reid, Organic Chemistry of Bivalent Sulfur, New York, Chemical Publishing Co., vol. II, 66–71 (1960).

It is preferred to carry out the electrolytic reduction of this invention in water as the solvent. Polar organic solvents, such as tetrahydrofuran; dimethylformamide; dioxane; acetonitrile; dimethylsulfoxide; hexamethyl phosphoramide; the lower alcohols such as methanol, ethanol, and isopropanol; organic acids, such as acetic acid and acetic acid-benzene mixtures; mixtures of the above organic solvents; mixtures of the above organic solvents and water; and the like may also be used.

An advantage of employing water as the solvent medium is that the usual supporting electrolytes are often more readily soluble in water than in organic solvents. However, if water is employed, it is necessary to use a cathode having a sufficient hydrogen overvoltage to allow the attainment of a sufficient electrical potential to reduce the sulfonium salt. For example, if p-phenylenedimethylene-bis(dimethylsulfonium chloride) is electrolyzed, a voltage of about —1.0 volt (versus saturated calomel electrode) at about 120 milliamps per 50 cm.$^2$ is advantageously employed. In the presence of metals having a low hydrogen overvoltage, the water will be electrolyzed at a lower voltage than this, and a sufficient potential to reduce the sulfonium salt may not be attained. Examples of cathode metals having a sufficient overvoltage for the reduction of this and similar sulfonium compounds in water include mercury, lead, zinc, tin, aluminum, and the like.

An electrical potential at which only the sulfonium salt is reduced is advantageously employed for the most efficient use of current and for preparing products of high purity. However, it is desirable in some instances to use a potential at which both the sulfonium salt and the solvent are reduced in order to increase the sulfonium reaction rate.

The process of this invention may either be carried out with a supporting electrolyte in the electrolysis solution or with the use of the sulfonium compound to be electrolytically polymerized as its own supporting electrolyte. Any of the conventional supporting electrolytes, typically salts of strong acids, may be employed.

The use of the sulfonium compound as its own supporting electrolyte is particularly advantageous for a continuous process. In a continuous process, as the concentration of the sulfonium compound is reduced due to its polymerization, additional sulfonium compound may be added to the solution for maintaining the concentration level.

It has been found that it is not necessary to have a solution of pure bis-sulfonium salt in order to produce polymers according to the process of this invention. A mixture of mono- and bis-sulfonium salts obtained from the incomplete reaction of, for example, p-xylene dichloride and dimethyl sulfide may be electroreduced to prepare poly-p-xylylene, even when the mono-sulfonium salt predominates.

This fact makes possible a particularly advantageous continuous process for preparing polymers in accordance with this invention. A mixture with an electrolysis solvent of a compound capable of being reacted to prepare a p-phenylene, halogen-substituted p-phenylene, or alkyl-substituted p-phenylene methylene-bis(dialkyl- or dihydroxyalkylsulfonium) salt, such as a compound of the formula

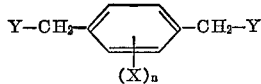

wherein X and $n$ are as defined previously, and Y is a halogen (preferably chlorine), a hydroxyl group, a sulfonate ester group of the formula —SO$_3$R, or a thioalkyl group of the formula —SR, wherein R is as defined previously, may be contacted with a compound that is capable of combining chemically therewith to produce the bis-sulfonium salt. When Y is a halogen, hydroxy group, or sulfonate ester, it is contacted with a dialkyl or di(hydroxyalkyl) sulfide of the formula R$_2$S, wherein R is as defined previously. When Y is a thioalkyl group, it is contacted with an alkyl halide of the formula RX′; wherein R is as defined previously and X′ is a halogen (preferably chlorine). The two compounds are allowed to combine chemically to a sufficient extent to give a solution of sulfonium salt in the electrolysis solvent of sufficient concentration to be reduced electrolytically (generally from .01 to 4 moles/liter). Under these conditions, the resulting product is a mixture of mono- and bis-sulfonium salts. The solution is then subjected to a sufficient electrical potential to reduce the sulfonium salt mixture.

As poly-p-xylylene or substituted poly-p-xylylene is produced, it precipitates and may be removed. Additional reactants for preparing sulfonium salts may be added as the concentration of sulfonium salt in the electrolysis solvent decreases. In spite of the above mixture in the electrolysis solvent, the polymers formed as a result of electroreduction of the sulfonium salts may be identified as poly-p-xylylene or substituted poly-p-xylylenes.

Whether a batch or continuous process is used, the concentration of sulfonium compound in the solution is desirably maintained between about 0.01 mole and about 4 moles/liter. If a supporting electrolyte is used, it is generally added to the electrolysis solution in an amount from 0.1 to 4 moles/liter.

The current and voltage depend on the size of the electrodes and the particular sulfonium compound to be reduced. The voltage may be determined from the half wave potential curve for the sulfonium salt to be reduced, and is generally selected from the ascending portion of the curve. In the case of p-phenylenedimethylene-bis(dimethylsulfonium chloride), a voltage of about —1.0 volt versus saturated calomel electrode (SCE) is preferred.

While the process may be operated at essentially any voltage and amperage within a range sufficient to reduce the sulfonium compounds, it is preferred to use controlled potential electrolysis. In this procedure, a potential (which may be determined by conventional polarographic measurements) selective for the particular sulfonium compound to be reduced is selected and maintained for the electrolysis. The technique of controlled potential electrolysis is explained in detail in Meites, "Controlled Potential Electrolysis" in A. Weissberger, ed., Technique of Organic Chemistry, vol. 1, 3rd. edition (Interscience, New York, 1959), pages 3281–3333.

For a controlled potential electrolysis, a three-compartment cell of the type described by Meites is employed. Such a cell was used for the examples set out below. In practice, the cathode compartment and contents are maintained in an inert gas atmosphere, such as argon or nitrogen, during the electrolysis. A direct current is supplied to the electrolysis cell with a variable potential difference between the anode and cathode in order to maintain the potential of the cathode surface at a chosen constant value as the concentration of depolarizer changes during the electrolysis. For a typical reduction of the sulfonium salt in which 0.5 N KCl was used as the supporting electrolyte, the cell resistance was approximately 200 ohms.

In the following examples, the initial sulfonium ion concentration was about 0.01 mole per liter in a 0.5 N supporting electrolyte (when used). The electrolysis cell was charged, purged of oxygen, and a paddle wheel stirrer was adjusted for speed and depth of penetration into the mercury surface. A slowly increasing voltage ($V_T$) was applied. The critical or reducing voltage ($V_R$) at the mercury surface was observed with a vacuum tube volt meter, and it levelled off as the sulfonium salt began to be reduced. If the stirring and sulfonium ion concentration were high enough, the $V_T$ could be further increased, resulting in a higher rate of electrolysis while $V_R$ remained constant. When the sulfonium ion concentration dropped below a critical value (estimated to be approximately $10^{-3}$ moles per liter), $V_R$ became more negative if $V_T$ was not reduced. Therefore, $V_T$ was progressively lowered as the sulfonium concentration approached zero. Alternatively, additional sulfonium compound may be added to the electrolysis solution to maintain the sulfonium ion concentration above its critical value.

DESCRIPTION OF THE PREFERRED EMBODIMENTS

The following examples illustrate the invention.

Example 1.—Poly-p-xylylene

Aqueous solutions of p-phenylenedimethylene-bis(dimethylsulfonium chloride) were electrolyzed, both in a 0.5 N KCl solution and while acting as its own supporting electrolyte, to give poly-p-xylylene. Observed by-products of the electrolysis were dimethyl sulfide and p-xylene.

A solution of 0.1 mole of p-xylylene dichloride, 0.9 mole of dimethyl sulfide and 400 ml. of methanol was maintained at 30° C. for 72 hours in a stirred flask to give p - phenylenedimethylene - bis(dimethylsulfonium chloride). The product was precipitated in acetone and dried. A 0.5 normal solution of the p-phenylenedimethylene-bis(dimethylsulfonium chloride) was placed in a preparative electrolytic cell using a stirred mercury cathode and carbon anodes separated by a salt bridge and under a nitrogen atmosphere. A current having a voltage (measured against a saturated calomel electrode) of −1.0 volt was passed through the solution at 120 milliamps. A white, fibrous precipitate was generated rapidly. The electrolysis was continued until the voltage began to rise. The resulting product was filtered off and dried in a vacuum until free of mercury. The product had a melt temperature of 425° C. as determined by differential thermal analysis, an X-ray diffraction pattern and an IR spectrum identical with a known sample of poly-p-xylylene. This polymer is useful as an electrical insulator.

Additional runs were made according to the same general procedure under the conditions shown in Table I, with the results shown below.

TABLE I.—ELECTROLYSIS OF p-PHENYLENEDIMETHYLENE-BIS(DIMETHYLSULFONIUM CHLORIDE)

| Run | 1 | 2 |
|---|---|---|
| Sulfonium salt concentration, moles/liter | 0.16 | 0.024 |
| Catholyte pH | 5 | 5 |
| Cathode voltage (v. saturated calomel electrode) | −1.01 | −1.00 |
| Yield poly-p-xylylene | >90% | |
| Melting point of product | 423° C. (DTA) | 423° C. (DTA) |
| Faradays passed during electrolysis | 6.58×10⁻² | |
| Current variation | 140 ma.—~1 ma | 44 ma. constant |
| Electrons passed/sulfonium reacted | 0.98 | |
| Supporting electrolyte | KCL 0.5N | Sulfonium self-supporting electrolyte |

Example 2.—Poly-p-xylylene (atmospheric conditions)

The same polymer as in Example 1 has been prepared with the surface of the catholyte exposed to the atmosphere. Starting material for the electrolysis was p-phenylenedimethylene-bis(dimethylsulfonium chloride). The sulfonium salt was in aqueous solution at 0.1 N chloride ion concentration and served as its own supporting electrolyte. A stirred mercury cathode was employed which was separated from the graphite anode by a cellophane membrane casing.

White product formed at the mercury cathode which on cleaning as in Example 1 was identified by infrared spectroscopy as poly-p-xylylene.

Example 3.—Preparation of:

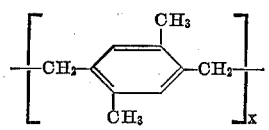

The example demonstrates that the electroreduction of 2,5 - dimethyl - p - phenylenedimethylene - bis(dimethylsulfonium chloride) at a mercury cathode in aqueous solution leads solid poly-2,5-dimethyl-p-xylylene. The electrolysis was performed in the same membrane separated cell as Example 2. The voltage was uncontrolled and only enough polymer was prepared for infrared spectroscopy identification purposes.

Example 4.—Poly-xylylene from mixed sulfonium salt solution

This example involves electroreduction of a two-component aqueous solution of p-chloromethylbenzyldiethanolsulfonium chloride and p-phenylenedimethylene-bis-(diethanolsulfonium chloride).

The mixed sulfonium salt solution was prepared by reacting 0.1 mole of p-xylylene dichloride with .05 mole of bis(hydroxyethyl) sulfide in a suspension of 300 ml. of methanol and 15 ml. of deionized water, to give a mole ratio of 11:1 of mono-sulfonium salt to bis-sulfonium salt. This was placed in a water bath at 60° C. for 24 hours with stirring. A clear homogeneous solution resulted. This solution was extracted from times with equal volumes of methylene chloride. It was 0.120 N in chloride ion by titration with AgNO₃.

This mixed solution was electroreduced by adding 10 ml. to 130 ml. of 0.5 N KCl (aqueous) and placing the resulting solution in the cathode compartment of a three-compartment cell of the type described by Meites. The other two compartments were filled with 0.5 N aqueous KCl. The cathode was stirred mercury, and anode of a graphite rod. Controlled potential electrolysis was performed, the reducing voltage being held from −1.4 to −1.5 volts versus SCE. Initial current was 100 ma. and final ~1 ma. The resulting solid white polymer which formed at the mercury surface was identified by its X-ray diffraction diagram, infrared analysis and melting point as being poly-p-xylylene.

Example 5.—Poly-p-xylylene at an aluminum cathode

This example demonstrates that the bis(dimethylsulfonium) salt of para-xylylene can be reduced at an aluminum cathode from dimethylformamide (DME). It is also an example in which the anion was chosen to give the sulfonium salt solubility in the solvent.

p - Phenylenedimethylene - bis(dimethylsulfonium perchlorate) was prepared from the corresponding bis(dimethylsulfonium chloride) by adding perchloric acid to an aqueous solution of the sulfonium salt. The perchlorate precipitated and could be separated by filtration.

Four grams of the perchlorate were dissloved in 200 ml. of dimethylformamide and placed in a single compartment cell containing an aluminum plate cathode and graphite anode. A magnetic stirrer was used for agitation of the electrolysis solution. Only sufficient current was passed to develop a coating on the metal cathode. This coating was first washed with water, then toluene followed by dimethylformamide and acetone. The coating was white and was scraped off for identification purposes. It was identified by infrared spectroscopy as poly-p-xylylene.

Example 6.—Poly-p-xylylene at a tin cathode

This example was the same as Example 5 except that the aluminum cathode was replaced by a tin plate cathode. Poly-p-xylylene was identfiied by infrared spectroscopy as the product which coated the tin cathode.

Example 7.—Poly-p-xylylene at an annealed steel cathode

This example was the same as Example 5 except that the aluminum cathode was replaced by annealed steel. Poly-p-xylylene was identified by infrared spectroscopy as the material coating the steel cathode.

Example 8.—Poly-p-xylylene at a lead cathode

This example is the same as Example 5 except that a lead plate cathode was used.

Poly-p-xylylene was identified by infrared spectroscopy as the coating which formed on the lead cathode.

Example 9.—Poly-p-xylylene at a lead cathode in aqueous solution p - Phenylenedimethylene - bis(dimethylsulfonium chloride) was used in aqueous solution (0.5 N in chloride) which was made 1 N in KI at time of electrolysis. A simple beaker having a graphite anode and lead cathode was used as electrolysis cell. Approximately 50 ma. was passed for about 10–20 seconds and as coating formed the current dropped to about 20 ma. The voltage drop (anode-cathode) was about three volts.

A cloudy coating was easily seen to form on the lead surface which had been machined to a shiny finish. This was identified as poly-p-xylylene by infrared spectroscopy.

Example 10.—Poly-p-xylylene at an aluminum cathode in aqueous solution

A 0.1 N solution of p - phenylenedimethylene - bis-(dimethylsulfonium chloride) was used in a simple beaker cell containing an aluminum cathode and graphite anode. Immediately before beginning the electrolysis, the aqueous solution was made 1 N in hydroxide ion by addition of NaOH. Enough current was passed to form a coating which was analyzed by infrared spectroscopy and found to contain poly-p-xylylene.

Example 11.—Poly-p-xylylene from p-phenylene-dimethylene-bis(diethylsulfonium chloride)

This example demonstrates that poly-p-xylylene can be prepared by electroreduction of p-phenylenedimethylene-bis(diethylsulfonium chloride) and also indicates an approximate upper limit for concentration of this sulfonium salt in aqueous solution at room temperature.

A saturated solution was prepared by the addition of 10 g. of the above sulfonium salt to 7 ml. of deionized water (4 moles/liter). This solution was electrolyzed in a very small open beaker cell employing a stirred mercury cathode and platinum anode. Voltage drop from anode to cathode was 3.5 volts and current flowing was 60 ma. The electrolysis was only carried on for approximately five minutes until sufficient product could be removed from the cell for infrared analysis and comparison with known spectra of poly-p-xylylene. The material isolated was identified as poly-para-xylylene.

Example 12.—Poly-p-xylylene from p-phenylenedi-methylene-bis(diethanolsulfonium nitrate)

0.3 mole of xylylene dichloride, 0.62 mole of bis(hydroxyethyl) sulfide, and 450 ml. of deionized water were placed in a stirred vessel for 5 days at 50° C. The resulting solution was diluted to 0.5 N in chloride with deionized water. The bis(diethanolsulfonium) salt as the chloride was then converted to the nitrate by adding AgNO₃ until no more precipitate could be detected forming in the clear supernatant solution. The supernatant liquid was then filtered to remove AgCl. Crystals of p-phenylenedimethylene - bis(diethanolsulfonium nitrate) were formed when ethyl acetate and methanol were added to the water solution. The nitrate was dissolved (2 grams/80 cc. of solvent) in dimethylformamide in which the electrolysis was carried out. An aluminum cathode and platinum anode were used in an open beaker cell.

As voltage was applied, the current moved to ~60 ma./square inch of aluminum but quickly decreased to ~20 ma./square inch. A white material coated the cathode in approximately 60 seconds and was washed with acetone and water. Infrared comparison with known standards showed the material to be poly-p-xylylene.

Example 13.—Electrolysis of 2,3,5,6-tetramethyl-p-phenylenedimethylene-bis(dimethylsulfonium chloride)

This example demonstrates that poly,2,3,5,6-tetramethyl-para-xylylene (I) can be produced

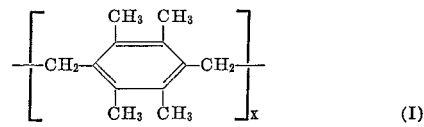

by electrolysis of the above bis(dimethylsulfonium) compound.

The sulfonium salt was prepared from 3,6-bis(chloromethyl) durene (II) by the same

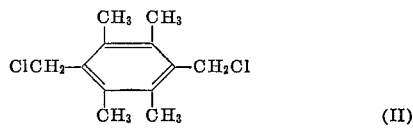

method used in Example 1. The sulfonium salt was electroreduced in water at a concentration of 0.015 moles/liter with a 0.5 N KCl supporting electrolyte.

The three-compartment cell described by Meites was used with a stirred mercury cathode and graphite anode. A nitrogen blanket was applied to the cathode compartment. The constant reducing potential was −1.05 volts versus SCE and initial electrolysis current was 500 ma. The reaction was run to completion, or until electrolysis current was approximately 2 ma. A fibrous mass was seen to form in the cathode compartment which was separated and found to contain metallic mercury. It was further purified by holding under vacuum at approximately 60° C. until the mercury was volatilized. A pure white material resulted which was identified by infrared analysis as poly, 2,3,5,6-tetramethyl-p-xylylene.

What is claimed is:

1. A process for preparing a polymer of repeat units having the formula

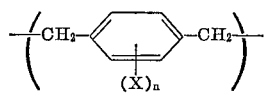

wherein X and $n$ are as defined below which comprises subjecting a solution in an electrolysis solvent of a sulfonium salt having the formula

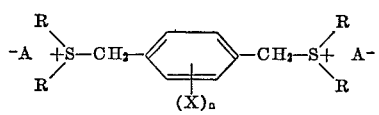

wherein X is a halogen or lower alkyl group, $n$ is an integer from 0 to 4, R is, independently in each case, a lower alkyl or hydroxyalkyl group, and A⁻ is an electrolytically acceptable anion to an electrical potential sufficient to reduce the sulfonium salt.

2. The process of claim 1 wherein $n$ is 0.
3. The process of claim 1 wherein R is a methyl group.
4. The process of claim 3 wherein $n$ is 0.
5. The process of claim 1 wherein A is a halogen.
6. The process of claim 1 wherein the electrolysis solvent is water or dimethylformamide and the sulfonium salt is subjected to the electrical potential in the presence of a mercury, aluminum, tin, steel, or lead cathode.
7. The process of claim 6 wherein $n$ is 0.
8. The process of claim 7 wherein R is a methyl group.
9. The process of claim 8 wherein $n$ is 0.
10. The process of claim 6 wherein A⁻ is a halide, nitrate, or perchlorate.

11. The process of claim 1 wherein a mixture with an electrolysis solvent of a compound capable of being reacted to prepare a sulfonium salt having the formula specified in claim 1 is contacted with a compound that is capable of combining chemically therewith to produce the sulfonium salt, and the compounds are allowed to combine chemically to a sufficient extent to give a solution of sulfonium salt in the electrolysis solvent of sufficient concentration to be reduced electrolytically.

References Cited

UNITED STATES PATENTS 3,399,124  8/1968  Gilch _____ 204—72

HOWARD S. WILLIAMS, Primary Examiner

H. M. FLOURNOY, Assistant Examiner

U.S. Cl. X.R.

204—72